(12) United States Patent
Hiramoto et al.

(10) Patent No.: US 6,647,605 B2
(45) Date of Patent: Nov. 18, 2003

(54) MACHINE TOOL AND ITS PALLET CHANGING DEVICE

(75) Inventors: Kazuyuki Hiramoto, Yamanashi (JP); Keigo Tada, Yamanashi (JP); Takashi Hoshi, Yamanashi (JP)

(73) Assignee: Makino Milling Machine Co., Ltd., Tokyo (JP)

(*) Notice: Subject to any disclaimer, the term of this patent is extended or adjusted under 35 U.S.C. 154(b) by 0 days.

(21) Appl. No.: 10/110,592

(22) PCT Filed: Aug. 9, 2001

(86) PCT No.: PCT/JP01/06880
§ 371 (c)(1),
(2), (4) Date: Apr. 11, 2002

(87) PCT Pub. No.: WO02/14013
PCT Pub. Date: Feb. 21, 2002

(65) Prior Publication Data
US 2002/0154962 A1 Oct. 24, 2002

(30) Foreign Application Priority Data
Aug. 14, 2000 (JP) .......................................... 2000-245798

(51) Int. Cl.[7] .................................................. B23Q 1/66
(52) U.S. Cl. ..................... 29/33 P; 409/159; 414/744.3; 198/346.1
(58) Field of Search ................................ 409/159, 170, 409/172, 160, 161, 163, 164; 29/33 P; 414/744.3; 198/346.1, 345.3, 465.1

(56) References Cited

U.S. PATENT DOCUMENTS

| 4,181,211 A | * | 1/1980 | Nishimura et al. | ...... 198/346.1 |
| 4,504,186 A | * | 3/1985 | Richards | .................. 414/744.3 |
| 4,673,076 A | * | 6/1987 | Mattson | .................. 198/346.2 |
| 4,781,512 A | * | 11/1988 | Ohta et al. | ................ 198/465.1 |
| 4,934,031 A | * | 6/1990 | Maeda et al. | ................ 29/33 P |
| 5,100,284 A | * | 3/1992 | Boisseau | .................. 414/744.3 |
| 5,992,608 A | * | 11/1999 | Ahn | ........................ 198/346.1 |
| 6,513,640 B2 | * | 2/2003 | Nishii | ...................... 198/346.1 |

FOREIGN PATENT DOCUMENTS

| JP | 1-228754 A | * | 9/1989 |
| JP | 3-221345 A | * | 9/1991 |
| JP | 4-75844 A | * | 3/1992 |

* cited by examiner

*Primary Examiner*—A. L. Wellington
*Assistant Examiner*—Erica E Cadugan
(74) *Attorney, Agent, or Firm*—Paul & Paul (57) ABSTRACT

The present relates to a machine tool for machining a workpiece by moving a tool and the workpiece relative to each other and to a pallet changer thereof. The machine tool is provided with a spindle for mounting the tool thereon, a table for a pallet (P) having the workpiece mounted thereon to be placed on the table, a pallet loading station for setting up the workpiece to the pallet (P) on the pallet loading station, and a pair of pallet change arms arranged to swivel about a vertical axis between the table and the pallet loading station, one pallet change arm (37) of which is arranged to be able to move independently of the other pallet change arm (37) in the vertical direction.

7 Claims, 5 Drawing Sheets

MACHINE TOOL AND ITS PALLET CHANGING DEVICE

TECHNICAL FIELD

The present invention relates to a machine tool for machining a workpiece by moving a tool and the workpiece relative to each other and to a pallet changer thereof, and particularly to a machine tool such as a machining center having a pallet changer attached thereto for changing pallets having a workpiece mounted thereon between a table and a pallet stocker, i.e. a pallet loading station and to a pallet changer thereof.

BACKGROUND ART

Generally, a machine tool such as a machining center is provided with a pallet changer, by which a pallet having a machined workpiece mounted thereon and placed on the table of the machine tool is exchanged with a pallet having a set-up workpiece mounted thereon and placed on a pallet loading station. Such a pallet changer is disclosed, for example, in Japanese Unexamined Utility Model Publication No. 2-53335. This pallet changer comprises pallet change arms which are adapted to be able to swivel about a vertical axis and to move up and down (in a vertical direction).

The pallet changer for a machine tool disclosed in Japanese Unexamined Utility Model Publication No. 2-53335 is configured of a frame structure including a beam arranged above the pallet change arms, an arm shaft fixed to the pallet change arms and supported vertically movably and swingably by the beam of the frame structure, and actuators arranged on the beam for vertically moving the arm shaft and swiveling it. In exchanging the pallets, the pallets are released from each of the table and the pallet loading station, and the pallet change arms are then moved up through the arm shaft by a first actuator, thereby to lift up the pallets on the table and on the pallet loading station to an upper pallet changing position. Next, the pallet change arms are swiveled through the arm shaft by a second actuator, so that the pallet on the side of the table (i.e. the machining position) is replaced with the pallet on the side of the pallet loading station (i.e. the standby position). After that, the pallet change arms are moved down to a lower pallet mounting position through the arm shaft by the first actuator, and the pallets are placed and fixed on the table and the pallet loading station, respectively.

In the pallet changer for the machine tool disclosed in Japanese Unexamined Utility Model Publication No. 2-53335, the pallet change arms on the sides of both the table and the pallet loading station can be moved down only to the same vertical position along with each other. In other words, the vertical position of the pallet on the side of the pallet loading station is set to the same vertical position as the pallet mounting position on the table.

While the workpiece on the pallet is being machined on the side of the table, the set-up process is conducted, on the side of the pallet loading station, for mounting on a pallet a next workpiece to be machined and removing the machined workpiece from the pallet, etc. In the case of the pallet changer disclosed in Japanese Unexamined Utility Model Publication No. 2-53335, however, the pallet change arms on the sides of the table and the pallet loading station can be moved down only to the same vertical position. Especially in a large-size machine tool such a machining center, this results in the very high vertical position for the pallet loading station, and therefore a stool or the like is required for the set-up job, thereby posing the problem of a deteriorated working environment and safety.

DISCLOSURE OF THE INVENTION

Accordingly, an object of the present invention is to provide a machine tool, and a pallet changer therefor, in which the vertical position of the working surface for the pallet loading station can be set to a lower level than the upper surface of the machine tool table in carrying out the set-up job for changing the pallets between the pallet loading station for set-up job and the table.

Another object of the invention is to provide a machine tool, and a pallet changer therefor, in which the vertical position of the pallet change arm on the side of the pallet loading station can be freely set independently of the vertical position of the upper surface of the table.

According to a first aspect of the present invention, there is provided a machine tool for machining a workpiece by moving a tool and the workpiece in relation to each other, which includes a spindle for mounting the tool thereon, a table for a pallet having the workpiece mounted thereon to be placed on the table, a pallet loading station for conducting the set-up job thereon including the mounting/demounting of the workpiece on/from the pallet, and a pallet changer including a pair of pallet change arms, each pallet change arm having a pallet holder for holding selected one of a pallet on the table and a pallet on the pallet loading station, the pair of the pallet change arms being swiveled about a vertical axis thereby to exchange the pallets between the table and the pallet loading station, the pair of the pallet change arms arranged to be able move independently of each other in the vertical direction.

According to a second aspect of the present invention, there is provided a machine tool for machining a workpiece by moving a tool and the workpiece in relation to each other, which includes a spindle for mounting the tool thereon, a table for a pallet having the workpiece mounted thereon to be placed on the table, a pallet loading station for conducting the set-up job including the mounting/demounting of the workpiece on/from the pallet, and a pallet changer including a support body interposed between the table and the pallet loading station and able to swivel about a vertical axis, and a pair of pallet change arms mounted on the support body and extending horizontally in opposite directions from the support body, the support body being swiveled thereby to move one of the pallet change arms from the side of the table to the side of the pallet loading station and the other pallet change arm from the side of the pallet load station to the side of the table, the pair of the pallet change arms being able to move independently of each other, in the vertical direction, on the support body.

According to a third aspect of the present invention, there is provided a machine tool for machining a workpiece by moving a tool and the workpiece in relation to each other, which includes a spindle for mounting the tool mounted thereon, a table for a pallet having the workpiece mounted thereon to be placed on the table, a pallet loading station for conducting the set-up job thereon including the mounting/demounting of the workpiece on/from the pallet, a base disposed between the table and the pallet loading station, a support body able to swivel in relation to the base about a vertical axis, swiveling means disposed on the base for swiveling the support body, a pair of pallet change arms, each pallet change arm including a pallet holder for holding a pallet on the table or a pallet on the pallet loading station, the pair of the pallet change arms arranged to swivel integrally with the support body by the swiveling means and to be able to move independently of each other in the vertical direction on the support body and first vertical driving means disposed on the support body for vertically moving one of the pair of the pallet change arms, second vertical driving means disposed on the support body in series with the first vertical driving means for vertically moving the pair of the pallet changer arms in cooperation with the first vertical driving means, and a stopper for restricting the movement of one of the pair of the pallet change arms on the side of the table, when the pair of the pallet change arms are moved downward by the second vertical driving means.

According to a fourth aspect of the present invention, there is provided a machine tool for machining a workpiece by moving a tool and the workpiece in relation to each other, which includes a spindle for mounting the tool mounted thereon, a table for a pallet having the workpiece mounted thereon to be placed on the table, a pallet loading station for conducting the set-up job including the mounting/demounting of the workpiece on/from the pallet, a base disposed between the table and the pallet loading station, a support body able to swivel in relation to the base about a vertical axis, swiveling means disposed on the base for swiveling the support body, a pair of pallet change arms, each pallet change arm including a pallet holder for holding a pallet on the table or a pallet on the pallet loading station, the pair of the pallet change arms arranged to swivel integrally with the support body by the swiveling means and to be able to move independently of each other in the vertical direction on the support body, first vertical driving means disposed on the support body for vertically moving one of the pair of the pallet change arms on the side of the pallet loading station, second vertical driving means disposed on the support body in series with the first vertical driving means for vertically moving said one of the pair of the pallet change arms on the side of the pallet loading station in cooperation with the first vertical driving means, and third vertical driving means disposed on the support body in parallel to the first vertical driving means and the second vertical driving means for vertically moving the other of the pair of the pallet change arms on the side of the table.

According to a fifth aspect of the present invention, there is provided a pallet changer which includes a support body able to swivel about a vertical axis and a pair of pallet change arms extending horizontally in opposite directions from the support body, the support body being swiveled thereby to move one of the pair of the pallet change arms from a machining position to a standby position and the other pallet change arm from the standby position to the machining position, wherein the pair of the pallet change arms are arranged to able to move independently of each other in the vertical direction on the support body.

In the pallet changer described above, preferably, during the downward movement of the pair of the pallet change arms, one of the pair of the pallet change arms can further move downward after the other pallet change arm stops. More preferably, the pair of the pallet change arms are moved in the vertical direction by a single operating rod driven by two cylinder units connected in series to each other, so that the pair of the pallet change arms can assume three different vertical positions, and that a stopper restricts the downward movement of one of the pair of the pallet change arms. Further, each of the pair of the pallet change arms may be moved in the vertical direction by a different operating rod driven by a different cylinder unit.

The configuration in which a pair of the pallet change arms can move independently of each other in the vertical direction makes it possible to move each of the pair of the pallet change arms in a different vertical position (height). Thus, one pallet (on the side of the pallet loading station) is not required to be set to the same height as the other pallet (on the side of the table), thereby to allow one pallet (on the side of the table) to be set freely to any height.

Especially, in view of the fact that one of the pair of the pallet change arms can move downward further than the other pallet change arm, the standby position (on the side of the pallet loading station) usable for the setup job, etc. can be set lower than the pallet in the machining position (on the side of the table) facing the machine tool.

Further, the downward movement of one of the pair of the pallet change arms driven by the vertical driving means is restricted by a stopper, so that the other pallet change arm alone can move down further.

Also, by moving the two pallet change arms independently of each other by different vertical driving means, only one of the pallet change arms can be moved downward further than the other pallet change arm.

With the configurations and operations described above, according to the present invention, a pair of pallet change arms are movable independently of each other in the vertical direction, and therefore the vertical position of the pallet change arm on the side of the pallet loading station can be set to a level lower than the vertical position of the pallet change arm on the side of the table of the machine tool. Thus, the working surface of the pallet loading station can be set low, thereby improving the efficiency and safety of the set-up job.

BRIEF DESCRIPTION OF THE DRAWINGS

The above and other objects, features and advantages of the present invention will be described in more detail below with reference to embodiments according to the present invention and in conjunction with the accompanying drawings.

BEST MODE FOR CARRYING OUT THE INVENTION

First, a machine tool according to an embodiment of the present invention will be described with reference to FIG. 3.

A machine tool 11 includes a bed 13, a column 15, a spindle head 17 mounted on the column 15, a spindle 19, a table 21 and a pallet loading station 23 for changing a pallet. In order that a pallet P placed on the table 21 and having a machined workpiece (not shown) mounted thereon may be replaced with another pallet P placed on the pallet loading station 23 and having a set-up workpiece (not shown) mounted thereon, a pallet changer 25 is disposed between the table 21 and the pallet loading station 23 of the machine tool 11.

Figure 3:
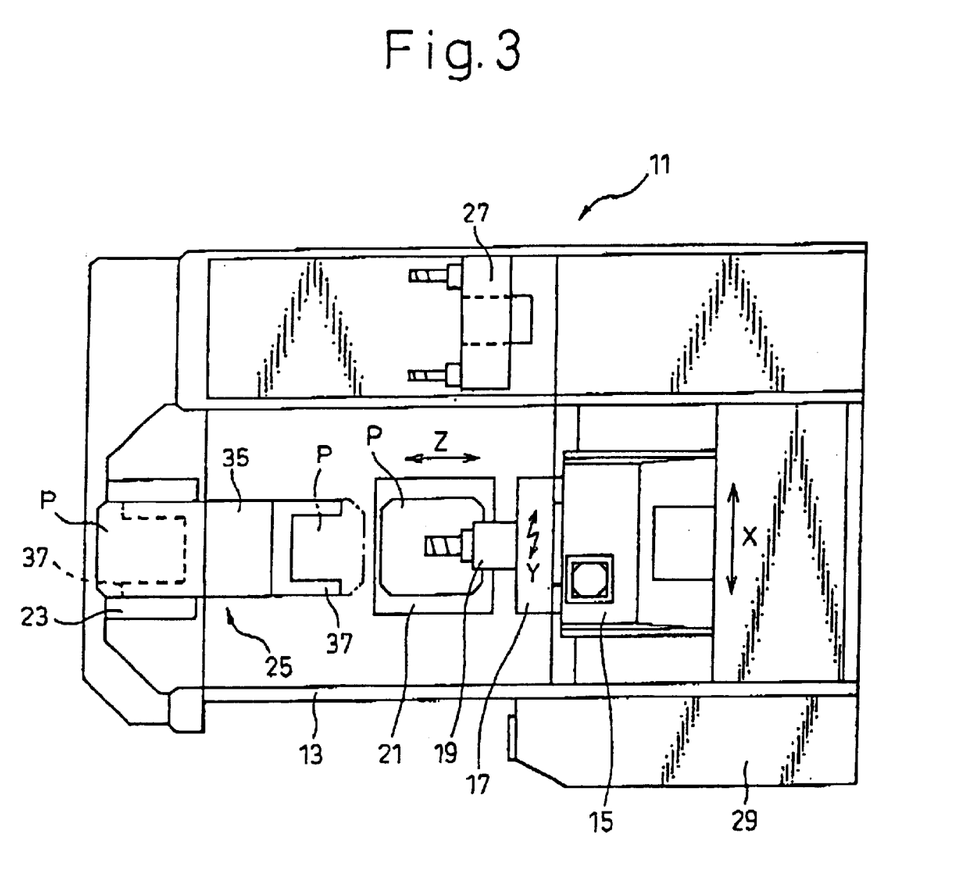
FIG. 3 is a plan view of a machine tool provided with the pallet changer shown in FIGS. 1 and 2.

In the machine tool 11 shown in FIG. 3, the spindle 19 is arranged horizontally, and the spindle head 17 is mounted to be able to move in the vertical direction (in a direction of a Y-axis) on the column by a well-known slide guide mechanism. The column 15 is movable in the lateral direction (in a direction of an x-axis) on the bed 13, as viewed from the front of the machine tool 11, while the table 21 is movable in the backward and forward direction (in a direction of a Z-axis) on the bed 13. Thus, the spindle 19 is movable in relation to the table 21 in the three directions along the X-, Y- and Z-axes. Further, a tool magazine 27 for an automatic tool changer is disposed on the left side of the spindle 19, and a NC unit 29 is disposed on the right side of the spindle 19.

Four tapered cones (not shown) are disposed on the upper surface of the table 21, and the pallet 7 having the workpiece mounted thereon are formed with corresponding depressions. Therefore, the pallet P can be accurately supported in position simply by placing it on the table 21. AS described above, the table 21 is movable in the backward and forward direction (along the Z-axis), and therefore is adapted to be movable in relation to the spindle 19 for the machining operation, thereby allowing the table 21 to move to the position of the pallet P indicated by chain line at the time of changing the pallet.

Next, the pallet changer 25 of the machine tool 11 according to the present invention shown in FIG. 1 will be described in detail with reference to FIGS. 1 and 2.

Figure 1:
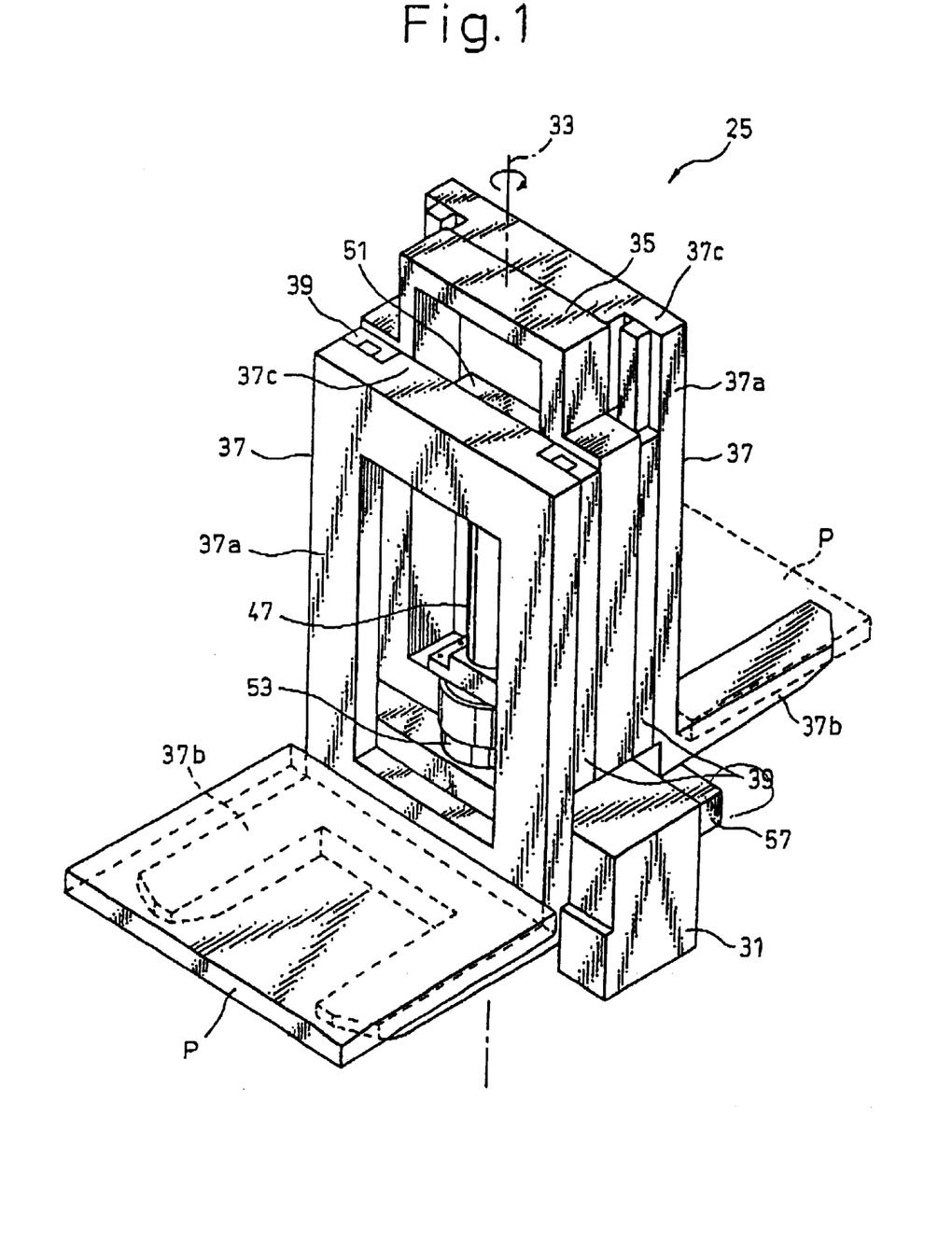
FIG. 1 is a perspective view showing a pallet changer of a machine tool according to the present invention.

Referring to FIG. 1, the pallet changer 25 includes a base 31 arranged on the bed 13 of the machine tool 11, an arm base, i.e. a support body 35 extending vertically from the base 31 and able to swivel about the vertical axis 33, and a pair of pallet change arms 37 extending horizontally in opposite directions from the support body 35. Normally, one of the two pallet change arms 37 is arranged at a position nearer to the machine tool 11 called "the machining position", while the other pallet change arm 37 is arranged at a position nearer to the pallet loading station 23 called "the standby position".

Each of pallet change arms 37 includes a slide plate 37a movable in the vertical direction on the support body 35 along a pair of guides 39 located on the support body 35, and a forked pallet holder 37b extending in the horizontal direction from the slide plate 37a, with the forward end thereof branching into two parts. The pallet change arm 37 is mounted movably on the support body 35 by the slide plate 37a. The upper portion of the slide plate 37a further includes a projected portion 37c projecting from the slide plate 37a and extending in the horizontal direction.

A pair of the pallet change arms 37 are driven in the vertical direction by the vertical driving means extending through the support body 35. Referring to FIG. 2, the vertical driving means includes a first cylinder unit (i.e. first vertical driving means) 41 mounted on the base 31 and extensible in the vertical direction, and a second cylinder unit (i.e. second vertical driving means) 47 connected in series with the first cylinder unit 41 though the operating end portion 45 of the operating rod 43 of the first cylinder unit 41 and extensible in the vertical direction. The operating end portion 51 of the operating rod 49 of the second cylinder unit 47 and the projected portion 37c of the pallet change arm 37 come into contact with each other, so that the driving force of the vertical driving means is transmitted to the pallet change arm 37, and the pallet change arm 37 moves vertically on the support body 35 along the guides 39.

Figure 2:
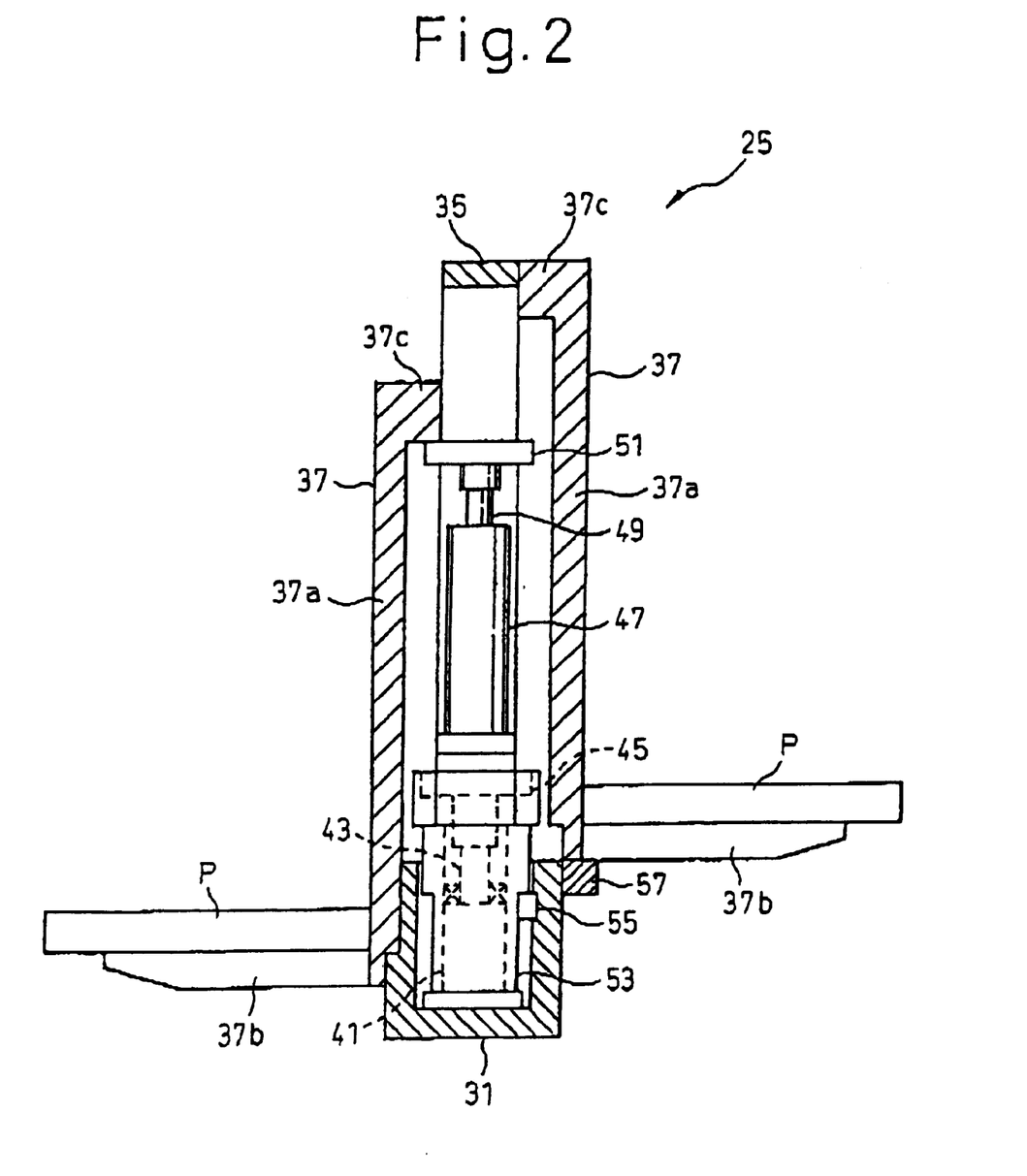
FIG. 2 is a partial sectional side view showing the internal structure of the pallet changer of the machine tool shown in FIG. 1.

In the embodiment shown in FIG. 2, the support body 35 is further coupled to the operating end portion 45 of the first cylinder unit 41, so that, in accordance with the extension or contraction of the first cylinder unit 41 in the vertical direction, the support body 35 is moved in the vertical direction together with the second cylinder unit 47.

The support body 35 can swivel in relation to the base 31 about the vertical axis 33 by the swiveling force applied thereto from the swiveling means. The swiveling means may be configured of, for example, a rack-pinion mechanism as shown in FIG. 2.

Referring to FIG. 2, the pinion 53 of the swiveling means is of a cylindrical shape with the vertical axis 33 as a rotational axis, and arranged as to surround the first cylinder unit 41. In FIG. 2, the first cylinder unit 41 surrounded by the cylindrical pinion 53 is shown by dotted line to facilitate the description. One end of the cylindrical pinion 53 is further connected fixedly to the bottom portion of the support body 35. The rack 55 in mesh with the pinion 53 is driven in the horizontal direction by an appropriate driving unit (not shown), so that the support body 35 swivels about the vertical axis 33, thereby causing the pair of pallet change arms 37 to swivel about the vertical axis 33.

The support body 35 to which the pinion 53 is connected is coupled with the first cylinder unit 41. In accordance with the extension/contraction of the first cylinder unit 41, therefore, the support body 35 moves in relation to the base 31 in the vertical direction, so that the pinion 53 connected to the support body 35 also moves in relation to the base 31 in the vertical direction. In order that the rack 55 arranged on the base 31 may be kept in engagement with the pinion 53 even when the pinion 53 moves in relation to the base 31 in the vertical direction, the pinion 53 is elongated along the vertical direction.

Although the embodiment shown in FIG. 2 employs the rack-pinion mechanism for swiveling the support body 35, other appropriate swiveling mechanisms can of course be used alternatively.

As described above, the two cylinder units 41, 47 are connected in series with each other, so that the pair of the pallet change arms 37 can be driven in the vertical direction by one operating rod 49 driven by the cylinder units 41, 47. This allows the pallet change arms 37 to assume three different positions (heights) in the vertical direction.

In the case where the pair of the pallet change arms 37 are moved by the first and second cylinder units 41, 47 connected in series with each other, however, the two pallet change arms 37 can assume only the same vertical position. In view of this, in the embodiment shown in FIG. 2, a stopper 57 is disposed on one side of the base 31 in order to restrict the movement (i.e. downward movement) of one (normally, the pallet change arm 37 in standby position) of the pair of the pallet change arms 37 during the downward movement of the pair of the pallet change arms 37.

As the result of provision of this stopper 57, while the pair of the pallet change arms 37 are being moved by a first and second cylinder units 41, 47 connected in series with each other, one (the pallet change arm in the standby position) of the pair of the pallet change arms 37 can be further moved downward after the other pallet change arm (in the machining position) 37 stops during the downward movement. In the pallet changer 25, therefore, the set-up job can be carried out on the side of the pallet change arm 37 capable of moving to a lower vertical position, while the pallet change arm 37 with the vertical position thereof restricted by the stopper 57 during the downward movement can be caused to face the machine tool. By doing this, the vertical position of the pallet change arm 37 in the standby position is not limited by the height of the table 21 of the machine tool 11.

Figure 4A:
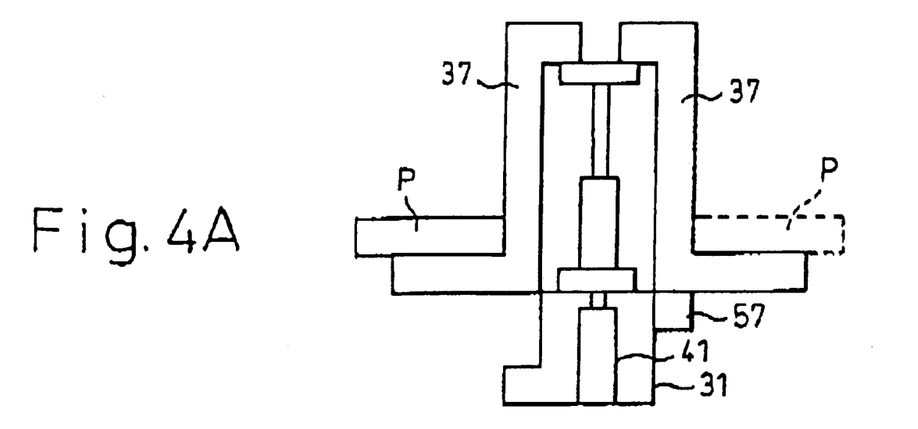
FIG. 4A is a schematic diagram showing the operation of a pallet changer of a machine tool according to the present invention, when mounting a pallet on the table of the machine tool.
Figure 4B:
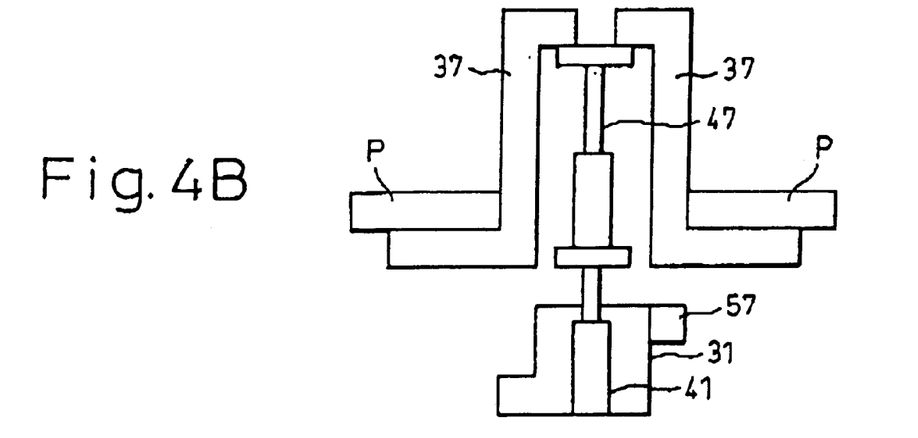
FIG. 4B is a schematic diagram showing the operation of the pallet changer for the machine tool according to the present invention, when exchanging the pallet on the side of the table with the pallet on the side of the pallet loading station.
Figure 4C:
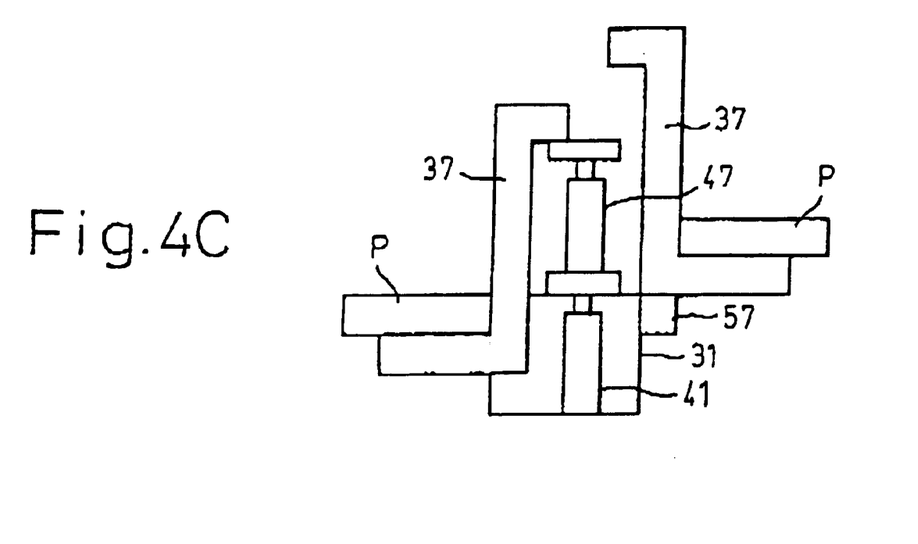
FIG. 4C is a schematic diagram showing the operation of the pallet changer for the machine tool according to the present invention, when mounting the pallet on the pallet loading station.

Next, the operation of the pallet changer 25 of the machine tool shown in FIGS. 1 and 2 will be described with reference to FIGS. 4A to 4C. In FIGS. 4A to 4C, the support body 35, etc. are omitted for the purpose of simplification.

While the pallet P is placed on the table 21 of the machine tool 11 and the workpiece mounted on the pallet P is being machined, the two pallet change arms 37 of the pallet changer 25 of the machine tool 11 according to the present invention stand by at the vertical position shown in FIG. 4A (where the pallet is placed and mounted on the table 21, hereinafter referred to as the table mounting position). When the machining of the workpiece is completed, the table 21 moves toward the pallet changer 25, so that the pallet P having the machined workpiece mounted thereon is transferred to the pallet change arm 37 of the pallet changer 25. Then, the first cylinder unit 41 extends to move the two pallet change arms 37 up to the vertical position shown in FIG. 4B (hereinafter referred to as the pallet changing position). As a result of the movement of the pallet change arms 37 up to the pallet change position, the base 31 ceases to prevent the swivel of the support body 35 and the pallet change arms 37. Thus, the support body 35 is swiveled by the rack-and-pinion mechanism, so that one pallet change arm 37 is swiveled from the machining position to the standby position while the other pallet change arm 37 is swiveled from the standby position to the machining position.

Next, the first cylinder unit 41 is contracted thereby to move the two pallet change arms 37 down to a vertical position where the pallet change arm 37 in the machining position (i.e. on the side of the machine tool) comes into contact with the stopper 57. At this time, the two pallet change arms 37 will assume the table mounting position, and the pallet P held by the pallet change arm 37 in the machining position will be mounted on the table 21 of the machine tool 11.

Further, after one (the pallet change arm in the machining position) of the pair of the pallet change arms 37 is stopped by the stopper 57, the second cylinder unit 47 is contracted to move the other pallet change arm 37 down to the vertical position shown in FIG. 4c (where the pallet is placed and mounted on the pallet loading station, hereinafter referred to as the pallet loading station mounting position). Under this condition, the pallet change arm 37 in the machining position is stopped by the stopper 57, and therefore cannot move down below the table mounting position. Thus, only the pallet change arm 37 in the standby position moves down to the pallet loading station mounting position, with the result that the pallet P held in the pallet change arm 37 in the standby position is mounted on the pallet loading station 23.

In this way, the pair of the pallet change arms 37 can be moved in the vertical direction independently of each other on the support body 35 to assume different vertical positions respectively. As a result, the vertical position of the pallet P in the standby position can be set lower than that of the pallet P in the machining position, so that the set-up job on the pallet loading station 23 is facilitated for an improved efficiency and safety of the set-up job.

When the set-up job for the workpiece is completed on the pallet loading station 23, on the side of which the pallet change arm 37 in the standby position is arranged, the second cylinder unit 47 is extended to move the pallet change arm 37 up to the table mounting position, as shown in FIG. 4A. Under the condition shown in FIG. 4C, only the projected portion 37c of the pallet change arm 37 in the standby position is in contact with the operating end portion 51 of the operating rod 49, and therefore only the pallet change arm 37 in the standby position moves up.

By moving the pallet change arms 37 in the standby position up to the table mounting position as shown in FIG. 4A when the set-up job is completed in the manner described above, it can be avoided that the time required for moving the pallet change arm 37 in the standby position between the pallet loading station mounting position and the table mounting position otherwise might have an effect on the machining time. Consequently, in spite of the capability of moving the pallet change arm 37 in the standby position down to a position lower than the pallet change arm 37 in the machining position, the machining time with the pallet changer 25 of the machine tool 11 according to the present invention is not longer than that with the conventional pallet changer in which a pair of the pallet change arms 37 cannot assume other than the same vertical position.

Although the pallet changer 25 of the machine tool 11 according to the present invention is described above with reference to an embodiment in which the pallet change arms 37 are moved in the vertical direction by the vertical driving means including the first and second cylinder units 41, 47 connected in series to each other, it is not limited to the embodiment described above. Also, since the scope of the present invention is defined by the appended claims, any modifications and changes can be made without departing from the scope of the same claims.

Figure 5:
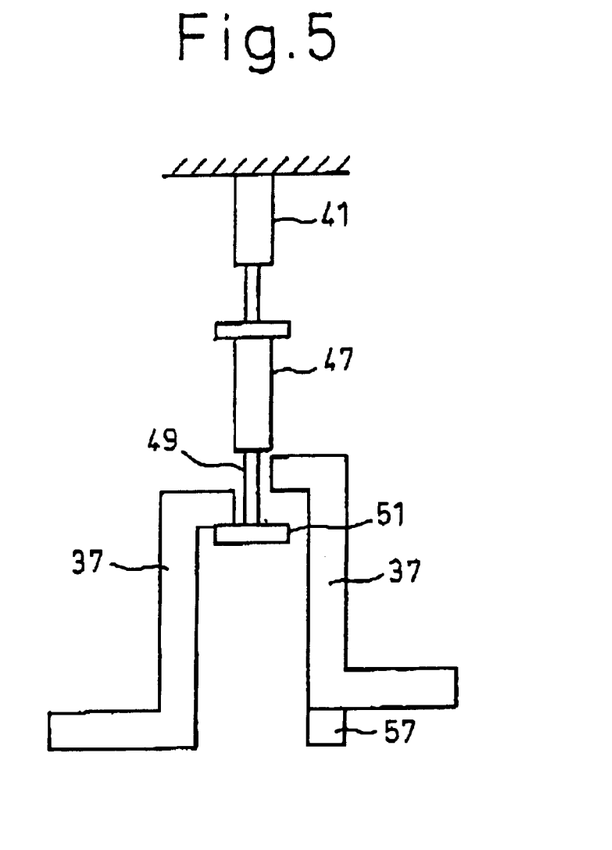
FIG. 5 is a schematic diagram showing a pallet changer for a machine tool according to another embodiment of the present invention.

As shown in FIG. 5, for example, the first and second cylinder units 41, 47 connected in series to each other may be suspended from the ceiling thereby to move the two pallet change arms 37 with a single operating rod 49 driven by the first and second cylinder units 41, 47 connected in series to each other. In such a case, as in the embodiment shown in FIGS. 1 and 2, the stopper 57 is required for restricting the downward movement of only one pallet change arm 37.

Figure 6:
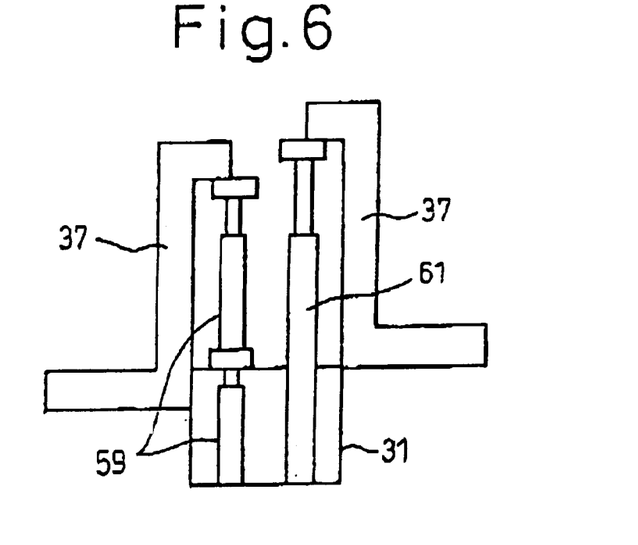
FIG. 6 is a schematic diagram showing a pallet changer for a machine tool according to still another embodiment of the present invention.

Also, as shown in FIG. 6, each of the two pallet change arms 37 may be driven by an independent vertical driving means. In the embodiment shown in FIG. 6, one of the pallet change arms 37 is driven by the two cylinder units 59 connected in series to each other, while the other pallet change arm 37 is driven by one cylinder unit 61. Therefore, the former pallet change arm 37 can take three different vertical positions, while the latter pallet change arm 37 can take two different vertical positions. Thus, the same operation as in the embodiment shown in FIGS. 1 and 2 can be performed without any stopper.

Further, in the embodiment shown in FIGS. 1 and 2, a single cylinder unit capable of taking three or more different positions can be employed in place of the first and second cylinder units 41, 47 connected in series to each other.

Incidentally, the support body 35, etc. are omitted in FIGS. 5 and 6 as in FIGS. 4A to 4C for the purpose of simplification.

What is claimed is:

1. A machine tool for machining a workpiece by moving a tool and the workpiece in relation to each other, said machine tool comprising:
   a spindle for mounting said tool thereon;
   a table for a pallet having said workpiece mounted thereon to be placed on said table;
   a pallet loading station for conducting a set-up job thereon including the mounting or demounting of said workpiece on or from said pallet; and
   a pallet changer including a pair of pallet change arms, each pallet change arm having a pallet holder for holding selected one of a pallet from or for said table and a pallet from or for said pallet loading station, said pair of the pallet change arms being swiveled about a vertical axis to thereby exchange the pallets between said table and said pallet loading station, said pair of the pallet change arms arranged to be able to move independently of each other in the vertical direction via means for moving the pallet change arms independently of each other.

2. The machine tool according to claim 1, wherein during a downward movement of said pair of the pallet change arms, one of said pair of the pallet change arms can further move downward after the other pallet change arms stops.

3. The machine tool according to claim 2, wherein said pair of the pallet change arms are moved in the vertical direction by a single operating rod driven by two cylinder units connected in series to each other, so that said pair of the pallet change arms can assume three different vertical positions, and wherein a stopper restricts the downward movement of one of said pair of the pallet change arms.

4. The machine tool according to claim 1, wherein each of said pair of the pallet change arms is moved in the vertical direction by a different operating rod driven by a different cylinder.

5. A machine tool for machining a workpiece by moving a tool and the workpiece in relation to each other, said machine tool comprising:
   a spindle for mounting said tool thereon;
   a table for a pallet having said workpiece mounted thereon to be placed on said table;
   a pallet loading station for conducting a set-up job thereon including the mounting or demounting of said workpiece on or from said pallet; and
   a pallet changer including a support body interposed between said table and said pallet loading station and able to swivel about a vertical axis, and a pair of pallet change arms mounted on said support body and extending horizontally in opposite directions from said support body, said support body being swiveled to thereby move one of said pallet change arms from the side of said table to the side of said pallet loading station and the other pallet change arm from the side of said pallet load station to the side of said table, said pair of the pallet change arms being able to move independently of each other in the vertical direction on said support body via means for moving the pallet change arms independently of each other.

6. A machine tool for machining a workpiece by moving a tool and the workpiece in relation to each other, said machine tool comprising:
   a spindle for mounting said tool thereon;
   a table for a pallet having said workpiece mounted thereon to be placed on said table;
   a pallet loading station for conducting a set-up job thereon including the mounting or demounting of said workpiece on or from said pallet;
   a base disposed between said table and said pallet loading station;
   a support body able to swivel in relation to said base about a vertical axis;
   swiveling means disposed on said base for swiveling said support body;
   a pair of pallet change arms, each pallet change arm including a pallet holder for holding a pallet for or from said table or a pallet for or from said pallet loading station, said pair of the pallet change arms arranged to swivel integrally with said support body by said swiveling means and to be able to move independently of each other in the vertical direction on said support body;
   first vertical driving means disposed on said support body for vertically moving one of said pair of the pallet change arms;
   second vertical driving means disposed on said support body in series with said first vertical driving means for vertically moving said pair of the pallet change arms in cooperation with said first vertical driving means; and
   a stopper for restricting the movement of one of the pair of pallet change arms on the side of said table, when said pair of the pallet change arms are moved downward by said second vertical driving means.

7. A machine tool for machining a workpiece by moving a tool and the workpiece in relation to each other, comprising:
   a spindle for mounting said tool thereon;
   a table for a pallet having said workpiece mounted thereon to be placed on said table;
   a pallet loading station for conducting a set-up job thereon including the mounting or demounting of said workpiece on or from said pallet;
   a base disposed between said table and said pallet loading station;
   a support body able to swivel in relation to said base about a vertical axis;
   swiveling means disposed on said base for swiveling said support body;
   a pair of pallet change arms, each pallet change arm including a pallet holder for holding a pallet for or from said table or a pallet for or from said pallet loading station, said pair of the pallet change arms arranged to swivel integrally with said support body by said swiveling means and to be able to move independently of each other in the vertical direction on said support body;
   first vertical driving means disposed on said support body for vertically moving one of said pair of the pallet change arms on the side of said pallet loading station;
   second vertical driving means disposed on said support body in series with said first vertical driving means for vertically moving said one of said pair of the pallet change arms on the side of said pallet loading station in cooperation with said first vertical driving means; and
   third vertical driving means disposed on said support body in parallel to said first vertical driving means and said second vertical driving means for vertically moving the other of said pair of the pallet change arms on the side of said table.

* * * * *